(12) United States Patent
Flieswasser et al.

(10) Patent No.: US 8,577,123 B2
(45) Date of Patent: Nov. 5, 2013

(54) METHOD AND SYSTEM FOR EVALUATING CONTACT ELEMENTS

(75) Inventors: Roni Flieswasser, Grimbergen (BE); Michael Lev, Yokneam (IL)

(73) Assignee: Camtek Ltd., Migdal Haemek (IL)

( * ) Notice: Subject to any disclaimer, the term of this patent is extended or adjusted under 35 U.S.C. 154(b) by 597 days.

(21) Appl. No.: 12/524,596

(22) PCT Filed: Jan. 27, 2008

(86) PCT No.: PCT/IL2008/000118
§ 371 (c)(1),
(2), (4) Date: Dec. 13, 2010

(87) PCT Pub. No.: WO2008/090563
PCT Pub. Date: Jul. 31, 2008

(65) Prior Publication Data
US 2011/0096980 A1     Apr. 28, 2011

Related U.S. Application Data

(60) Provisional application No. 60/886,688, filed on Jan. 26, 2007, provisional application No. 60/886,693, filed on Jan. 26, 2007.

(51) Int. Cl.
*G06K 9/00* (2006.01)
*G01R 31/20* (2006.01)
*G01N 21/00* (2006.01)

(52) U.S. Cl.
USPC .... 382/145; 382/151; 324/754.03; 356/237.1

(58) Field of Classification Search
USPC ......... 382/145, 151, 286; 324/754, 758, 73.1, 324/690, 765, 762.05, 755.05, 754.04, 324/750.25, 754.07, 537, 754.03; 438/14–25; 356/237.1–237.6, 501; 33/559, 503, 561, 832, 558, 504, 505; 977/852, 851; 700/195
See application file for complete search history.

(56) References Cited

U.S. PATENT DOCUMENTS

| | | | |
|---|---|---|---|
| 4,794,647 A | 12/1988 | Forgues et al. | |
| 6,987,875 B1 | 1/2006 | Wallack | |
| 7,026,832 B2 * | 4/2006 | Chaya et al. | 324/754.1 |
| 2004/0081349 A1 | 4/2004 | Chaya et al. | |

FOREIGN PATENT DOCUMENTS

| WO | WO 2007/026361 | 3/2007 |
|---|---|---|
| WO | WO 2008/007363 | 1/2008 |

OTHER PUBLICATIONS

Wen-Yen et al., "Automated Inspection of Printed Circuit Boards Through Machine Vision", Computers in Industry, Elsevier Science Publishers, Amsterdam, Netherlands, vol. 28, No. 2, May 1, 1996, pp. 103-111.
International Search Report for International Application No. PCT/IL2008/000118 mailed Apr. 3, 2009.

* cited by examiner

*Primary Examiner* — Sheela Chawan
(74) *Attorney, Agent, or Firm* — Oren Reches

(57) ABSTRACT

A method, system and a computer program product for evaluating contact elements, the method includes: acquiring images of multiple groups of contact elements, wherein each group of contact element was expected to be contacted during a test by the same group of probes so as to form multiple probe marks; and evaluating at least one characteristic of a first contact element in response to a comparison between a number of potential probe marks that appear in the image of a first contact element and a number of potential probe marks that appear in an image of a second contact element.

22 Claims, 8 Drawing Sheets

```
┌─────────────────────────────────────────────────────────────┐
│  Acquiring or storing images of multiple groups of contact elements, │
│  wherein each group of contact element was expected to be contacted  │
│  (during a test) by the same group of probes so as to form multiple  │
│                       probe marks. 110                               │
└─────────────────────────────────────────────────────────────┘
                              │
                              ▼
┌─────────────────────────────────────────────────────────────┐
│  ┌───────────────────────────────────────────────────────┐  │
│  │ Determining that an obstacle prevented a functioning  │  │
│  │ probe from contacting a contact element during one    │  │
│  │ or more tests. 424                                    │  │
│  └───────────────────────────────────────────────────────┘  │
│                                                             │
│       ┌────────────────────────────────────────────┐        │
│       │ Determining that a probe is defective. 444 │        │
│       └────────────────────────────────────────────┘        │
│                                                             │
│  Evaluating at least one test characteristic in response to │
│  a comparison between a number of potential probe marks     │
│  that appear in the image of a first contact element and a  │
│  number of potential probe marks that appear in at least    │
│  one image of at least one other contact element. 420       │
└─────────────────────────────────────────────────────────────┘
```

Acquiring images of at least three groups of contact elements of an electrical circuit, wherein each group of contact elements was expected to be contacted during a test by the same group of probes so as to form multiple probe marks. 710

↓

Evaluating at least one characteristic of a contact element out of the at least three groups of contact elements in response to a comparison between at least one characteristic of each contact element out of a set of contact elements; wherein the set comprises at least at three contact elements out of the at least three groups of contact elements. 720

Obtaining multiple images of the first contact element by applying different image acquisition conditions. 760

Measuring a depth of at least one probe mark. 770

Determining a spatial relationship (shift, rotation, height changes) between a first group of potential probe marks and a second group of potential probe marks. 780

Re-evaluating a characteristic of a previously evaluated contact element after additional images of corresponding contact elements were acquired. 790

METHOD AND SYSTEM FOR EVALUATING CONTACT ELEMENTS

CROSS-REFERENCE TO RELATED APPLICATIONS

This application is a National Phase Application of PCT International Application No. PCT/IL2008/000118, entitled "METHOD AND SYSTEM FOR EVALUATING CONTACT ELEMENTS", International Filing Date Jan. 27, 2008, published on Jul. 31, 2008 as International Publication No. WO 2008/090563, which in turn claims priority from U.S. Provisional Patent Application No. 60/886,688, filed Jan. 26, 2007 and U.S. Provisional Patent Application No. 60/886,693, filed Jan. 26, 2007, all of which are incorporated herein by reference in their entirety.

FIELD OF THE INVENTION

The invention relates to methods and devices for evaluating contact elements and especially for evaluating contact elements of electrical circuits such as but not limited to bumps or bond pads.

BACKGROUND OF THE INVENTION

Electrical circuits such as wafers or printed circuit boards are electrically or functionality tested by various existing industrial equipment that uses probes that contact dedicated contact elements such as bond-pads or bumps. A probe card includes many probes, which can be arranged with various layouts. A probe card can be shaped such as to contact one or more groups of bond-pads or bumps at a time.

The probe is usually made of a very tough material and its end (its tip) is very small. Bond pads or bumps are usually much larger and are made of less durable materials. When a probe contacts a bond pad or a bump it can deform the bond-pad or bump. This deformation is known as a probe mark. Some probe marks can render the wafer inoperative. In some cases the probe can pass through the bond pad and expose inner portions of underlying material.

FIG. 1 illustrates a prior art image of multiple bumps (such as bump 92) and probe marks (such as probe mark 90). FIG. 2 illustrates a prior art bond pad 94 with a probe mark 96.

After the electrical or functional test ends the electrical circuits and especially their bond pads or bumps are optically inspected.

Various foreign particles, corrosion, foreign material as well as various artifacts (hereinafter—artifacts) can resemble probe marks. In many cases automatic inspection systems can identify these artifacts as probe marks. This erroneous identification can cause functional dice to be defined as non-functional dice and is very costly.

There is a growing need to provide efficient systems and methods for evaluating contact elements.

SUMMARY OF THE INVENTION

A method for evaluating contact elements. The method includes: (i) acquiring images of multiple groups of contact elements, wherein each group of contact elements was expected to be contacted during a test by the same group of probes so as to form multiple probe marks; and (ii) evaluating at least one characteristic of a first contact element in response to a comparison between a number of potential probe marks that appear in the image of a first contact element and a number of potential probe marks that appear in an image of a second contact element.

Conveniently, the first contact element and the second contact element belong to different groups of contact elements.

Conveniently, the first contact element and the second contact element were expected to be contacted by the same probe out of the group of probes.

Conveniently, the first contact element and the second contact element belong to the same group of contact elements.

Conveniently, the evaluating is further responsive to differences between an expected number probe marks within the image of the first contact element and an expected number of probe marks within the image of the second contact element.

Conveniently, the method includes evaluating at least one characteristic of a first contact element in response to a comparison between a number of potential probe marks that appear in the image of the first contact element and numbers of potential probe marks that appears in multiple images of multiple other contact elements.

Conveniently, the method includes evaluating at least one test characteristic in response to the at least one characteristic of the contact element.

Conveniently, the method includes evaluating at least one test characteristic in response at least one change in a number of potential probe marks that appear in images of different contact elements that were expected to be contacted by the same probe.

Conveniently, the evaluating includes ignoring an artifact that resembles a probe mark.

Conveniently, the evaluating includes determining that an obstacle prevented a functioning probe from contacting a contact element during one or more tests.

Conveniently, the evaluating includes determining that a probe is defective.

Conveniently, the method includes obtaining multiple images of the first contact element by applying different image acquisition conditions.

Conveniently, the method includes measuring a depth of at least one probe mark.

Conveniently, the method includes determining a spatial relationship between a first group of potential probe marks and a second group of potential probe marks.

Conveniently, the contact elements are bond pads or bumps.

A system for evaluating contact elements, the system includes: (i) a storage unit adapted to store images of multiple groups of contact elements, wherein each group of contact element was expected to be contacted, during a test, by the same group of probes so as to form multiple probe marks; and (ii) a processor that is adapted to evaluate at least one characteristic of a first contact element in response to a comparison between a number of potential probe marks that appear in the image of the first contact element and a number of potential probe marks that appear in an image of a second contact element.

Conveniently, the contact elements are bond pads or bumps.

Conveniently, the first contact element and the second contact element belong to different groups of contact elements.

Conveniently, the first contact element and the second contact element were expected to be contacted by the same probe out of the group of probes.

Conveniently, the first contact element and the second contact element belong to the same group of contact elements.

Conveniently, the processor is adapted to evaluate at least one characteristic of a first contact element in response to differences between an expected number probe marks within the image of the first contact element and an expected number of probe marks within the image of the second contact element.

Conveniently, the processor is adapted to evaluate at least one characteristic of a first contact element in response to a comparison between a number of potential probe marks that appear in the image of a first contact element and numbers of potential probe marks that appears in multiple images of multiple other contact elements.

Conveniently, the processor is adapted to evaluate at least one characteristic of a first contact element in response at least one change in a number of potential probe marks that appear in images of different contact elements that were expected to be contacted by the same probe.

Conveniently, the processor is adapted to evaluate at least one test characteristic in response to the comparison between the number of potential probe marks that appear in the image of the first contact element and the number of potential probe marks that appear in the image of the second contact element.

Conveniently, the processor is adapted to ignore an artifact that resembles a probe mark.

Conveniently, the processor is adapted to determine that an obstacle prevented a functioning probe from contacting a contact element during one or more tests.

Conveniently, the processor is adapted to determine that a probe is defective.

Conveniently, the processor is adapted to measure a depth of at least one probe mark.

Conveniently, the processor is adapted to determine a spatial relationship between a first group of potential probe marks and a second group of potential probe marks.

Conveniently, the system includes an image acquisition unit that is adapted to acquire the images of multiple groups of contact elements.

Conveniently, the image acquisition unit is adapted to obtain multiple images of the first contact element by applying different image acquisition conditions.

A computer program product including a computer usable medium including a computer readable program, wherein the computer readable program when executed on a computer causes the computer to: receive images of multiple groups of contact elements, wherein each group of contact element was expected to be contacted during a test by the same group of probes so as to form multiple probe marks; and evaluate at least one characteristic of a contact element in response to a comparison between a number of potential probe marks that appear in the image of a first contact element and a number of potential probe marks that appear in an image of a second contact element.

Conveniently, the first contact element and the second contact element belong to different groups of contact elements.

Conveniently, the first contact element and the second contact element were expected to be contacted by the same probe out of the group of probes.

Conveniently, the first contact element and the second contact element belong to the same group of contact elements.

Conveniently, the computer readable program when executed on a computer causes the computer to evaluate at least one characteristic of a first contact element in response to differences between an expected number probe marks within the image of the first contact element and an expected number of probe marks within the image of the second contact element.

Conveniently, the computer readable program when executed on a computer causes the computer to evaluate at least one characteristic of a first contact element in response to a comparison between a number of potential probe marks that appear in the image of a first contact element and numbers of potential probe marks that appears in multiple images of multiple other contact elements.

Conveniently, the computer readable program when executed on a computer causes the computer to evaluate at least one characteristic of a first contact element in response at least one change in a number of potential probe marks that appear in images of different contact elements that were expected to be contacted by the same probe.

Conveniently, the computer readable program when executed on a computer causes the computer to evaluate at least one test characteristic in response to the comparison between the number of potential probe marks that appear in the image of the first contact element and the number of potential probe marks that appear in the image of the second contact element.

Conveniently, the computer readable program when executed on a computer causes the computer to ignore an artifact that resembles a probe mark.

Conveniently, the computer readable program when executed on a computer causes the computer to determine that an obstacle prevented a functioning probe from contacting a contact element during one or more tests.

Conveniently, the computer readable program when executed on a computer causes the computer to determine that a probe is defective.

Conveniently, the computer readable program when executed on a computer causes the computer to measure a depth of at least one probe mark.

Conveniently, the computer readable program when executed on a computer causes the computer to determine a spatial relationship between a first group of potential probe marks and a second group of potential probe marks.

A method for evaluating contact elements, conveniently, includes: acquiring images of at least three groups of contact elements of an electrical circuit, wherein each group of contact elements was expected to be contacted during a test by the same group of probes so as to form multiple probe marks; and evaluating at least one characteristic of a contact element out of the at least three groups of contact elements in response to a comparison between at least one characteristic of each contact element out of a set of contact elements; wherein the set includes at least at three contact elements out of the at least three groups of contact elements.

Conveniently, the contact elements of the set belong to different groups of contact elements.

Conveniently, the contact elements of the set were expected to be contacted by the same probe out of the group of probes.

Conveniently, at least a pair of contact elements of the set belongs to the same group of contact elements.

Conveniently, the evaluating is further responsive to differences between expected numbers of probe marks within an image of each contact element of the set.

Conveniently, the method includes evaluating at least one test characteristic in response to the at least one characteristic of at least one contact element of the set.

Conveniently, the evaluating includes ignoring an artifact that resembles a probe mark.

Conveniently, the evaluating includes determining that an obstacle prevented a functioning probe from contacting a contact element during one or more tests.

Conveniently, the evaluating includes determining that a probe is defective.

Conveniently, the method includes obtaining multiple images of a contact element of the set by applying different image acquisition conditions.

Conveniently, the method includes measuring a depth of at least one probe mark.

Conveniently, the method includes determining a spatial relationship between a first group of potential probe marks and a second group of potential probe marks.

Conveniently, the contact elements are bond pads or bumps.

A system for evaluating contact elements, conveniently, includes:

a storage unit adapted to store images of at least three groups of contact elements of an electrical circuit, wherein each group of contact elements was expected to be contacted during a test by the same group of probes so as to form multiple probe marks; and a processor, adapted to evaluate at least one characteristic of a contact element out of the at least three groups of contact elements in response to a comparison between at least one characteristic of each contact element out of a set of contact elements; wherein the set includes at least at three contact elements out of the at least three groups of contact elements.

Conveniently, the contact elements of the set belong to different groups of contact elements.

Conveniently, the contact elements of the set were expected to be contacted by the same probe out of the group of probes.

Conveniently, at least a pair of contact elements of the set belongs to the same group of contact elements.

Conveniently, the processor is responsive to differences between expected numbers of probe marks within an image of each contact element of the set.

Conveniently, the processor is adapted to evaluate at least one test characteristic in response to the at least one characteristic of at least one contact element of the set.

Conveniently, the processor is adapted to ignore an artifact that resembles a probe mark.

Conveniently, the processor is adapted to determine that an obstacle prevented a functioning probe from contacting a contact element during one or more tests.

Conveniently, the processor is adapted to determine that a probe is defective.

Conveniently, the system includes an image acquisition unit adapted to obtain multiple images of a contact element of the set by applying different image acquisition conditions.

Conveniently, the processor is adapted to measure a depth of at least one probe mark.

Conveniently, the processor is adapted to determine a spatial relationship between a first group of potential probe marks and a second group of potential probe marks.

Conveniently, the contact elements are bond pads or bumps.

A computer program product including a computer usable medium including a computer readable program, wherein the computer readable program when executed on a computer causes the computer to: receive images of at least three groups of contact elements of an electrical circuit, wherein each group of contact elements was expected to be contacted during a test by the same group of probes so as to form multiple probe marks; and evaluate at least one characteristic of a contact element out of the at least three groups of contact elements in response to a comparison between at least one characteristic of each contact element out of a set of contact elements; wherein the set includes at least at three contact elements out of the at least three groups of contact elements.

Conveniently, the contact elements of the set belong to different groups of contact elements.

Conveniently, the contact elements of the set were expected to be contacted by the same probe out of the group of probes.

Conveniently, at least a pair of contact elements of the set belongs to the same group of contact elements.

Conveniently, the processor is responsive to differences between expected numbers of probe marks within an image of each contact element of the set.

Conveniently, the computer readable program when executed on a computer causes the computer to evaluate at least one test characteristic in response to the at least one characteristic of at least one contact element of the set.

Conveniently, the computer readable program when executed on a computer causes the computer to ignore an artifact that resembles a probe mark.

Conveniently, the computer readable program when executed on a computer causes the computer to determine that an obstacle prevented a functioning probe from contacting a contact element during one or more tests.

Conveniently, the computer readable program when executed on a computer causes the computer to determine that a probe is defective.

Conveniently, the computer readable program when executed on a computer causes the computer to receive multiple images of a contact element of the set by applying different image acquisition conditions.

Conveniently, the computer readable program when executed on a computer causes the computer to measure a depth of at least one probe mark.

Conveniently, the computer readable program when executed on a computer causes the computer to determine a spatial relationship between a first group of potential probe marks and a second group of potential probe marks.

Conveniently, the contact elements are bond pads or bumps.

BRIEF DESCRIPTION OF THE DRAWINGS

The present invention will be readily understood by the following detailed description in conjunction with the accompanying drawings, wherein like reference numerals designate like structural elements.

FIG. 6 illustrates a method for evaluating a test characteristic according to an embodiment of the invention;

FIG. 8 illustrates a method for evaluating contact elements, according to an embodiment of the invention.

DETAILED DESCRIPTION OF THE DRAWINGS

Figure 1:
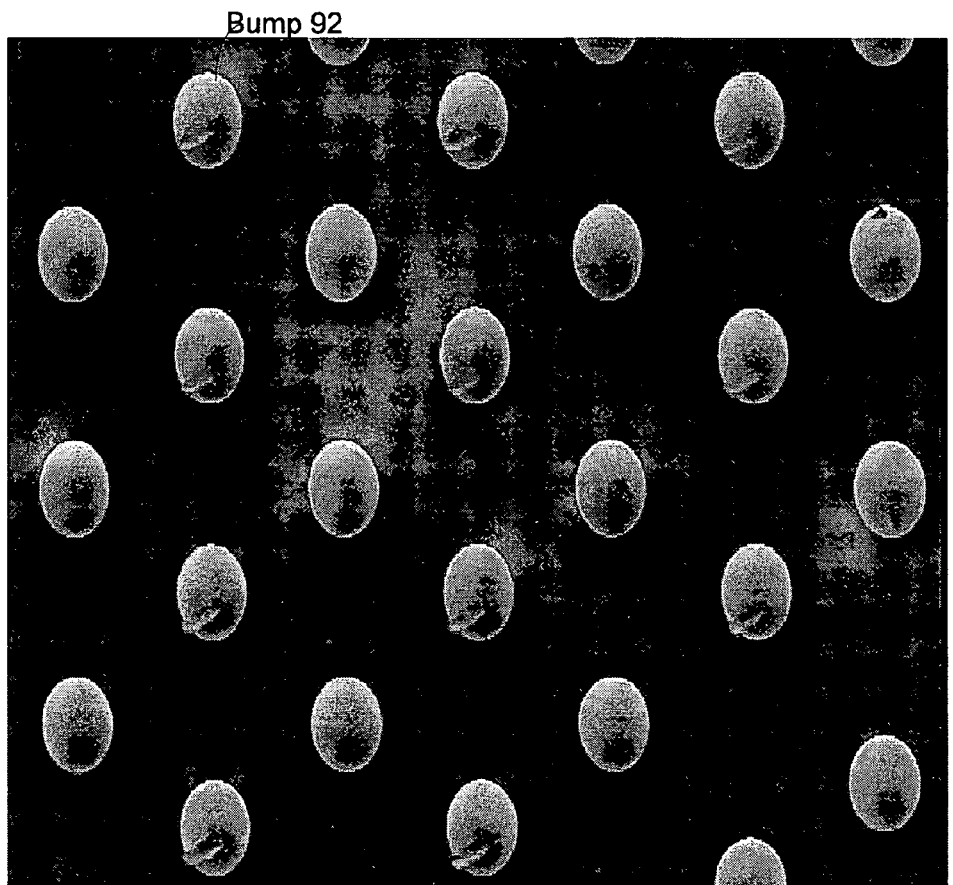
FIG. 1 illustrates a prior art image of multiple bumps and probe marks.
Figure 2:
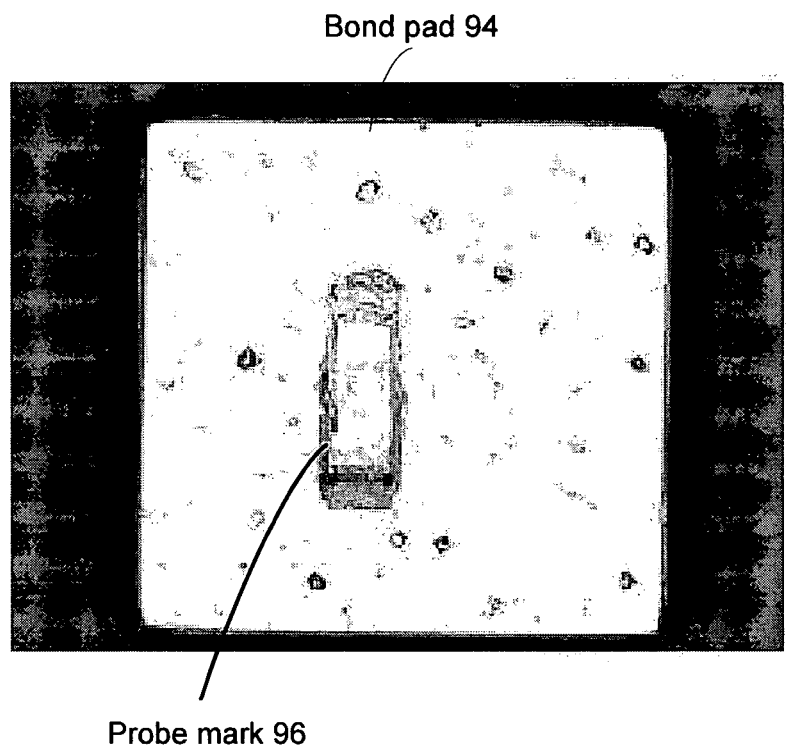
FIG. 2 illustrates a prior art bond pad with a probe mark.

The term "potential probe mark" includes an actual probe mark or an artifact that resembles a probe mark. Conveniently, the resemblance between such an artifact and a probe mark can cause an automatic inspection system to erroneously classify that artifact as a probe mark.

The term "contact element" refers to an element that is expected to be contacted by a probe, especially during a test (such an electrical test) of a circuit that is electrically connected to that contact element. Typical contact elements include bond-pads or bumps.

The term "characteristic of a contact element" refers to the presence (or lack of presence) of potential probe marks but can also refer to its physical condition. For example it can indicate a validity of the contact element, whether it includes an artifact, whether it include too many potential probe marks, whether it includes fewer potential probe marks than expected, whether the contact element was severely deformed the like.

The term "test characteristic" refers to a functionality of a single probe, a functionality of a group of probes, spatial relationship between the group of probes and groups of contact element (including shifts, rotations, z-axis translation), and the like. It can indicate whether a certain probe is defective so that it does not touch a contact element it was expected to contact, whether an obstacle (including an artifact) prevented a probe from touching a contact element while not preventing the probe from touching other contact elements, and the like. The following text refers to an evaluation that is based upon the number of potential probe marks within contact elements. It is noted that the evaluation can further include additional analysis of the potential probe marks. This additional analysis can include determining potential probe mark characteristics (also referred to potential probe mark classification), determining which potential probe marks are actual probe marks or artifacts, determining contact element functionality in view of the potential probe marks and the like.

Unless stated otherwise, terms such as "first" and "second" are used to arbitrarily distinguish between the elements such terms describe. Thus, these terms are not necessarily intended to indicate temporal or other prioritization of such elements.

It is noted that the number of potential probe marks that appear in an image of a contact element can include zero, one or multiple potential probe marks.

A system, a method and a computer program product are provided. By comparing the number, of potential probe marks that appear in images of different contact element missing probe marks can be detected and, additionally or alternatively, potential probe marks that are not actual probe marks can be ignored of. According to an embodiment of the invention images of two (or more) contact elements that are expected to be touched by the same probe are compared to each other. It is noted that images of more than two contact elements can be compared to each other.

According to an embodiment of the invention images of two (or more) contact elements that belong to the same group of contacts but are expected to be touched by different probes (that belong to the same group of probes) are compared to each other.

According to another embodiment of the invention images of multiple contact elements are compared to each other, some contact elements belong to different groups of contact elements but were supposed to be contacted by the same probe while other contact elements belong to the same group of contact elements but were supposed to be contacted by different probes of the same group of probes.

It is noted that during a test of multiple groups of contact elements some groups of contact elements can be expected to be contacted more times than others. In this case the comparison should take into account the differences between the expected numbers of potential probe marks per contact element groups.

Figure 3:
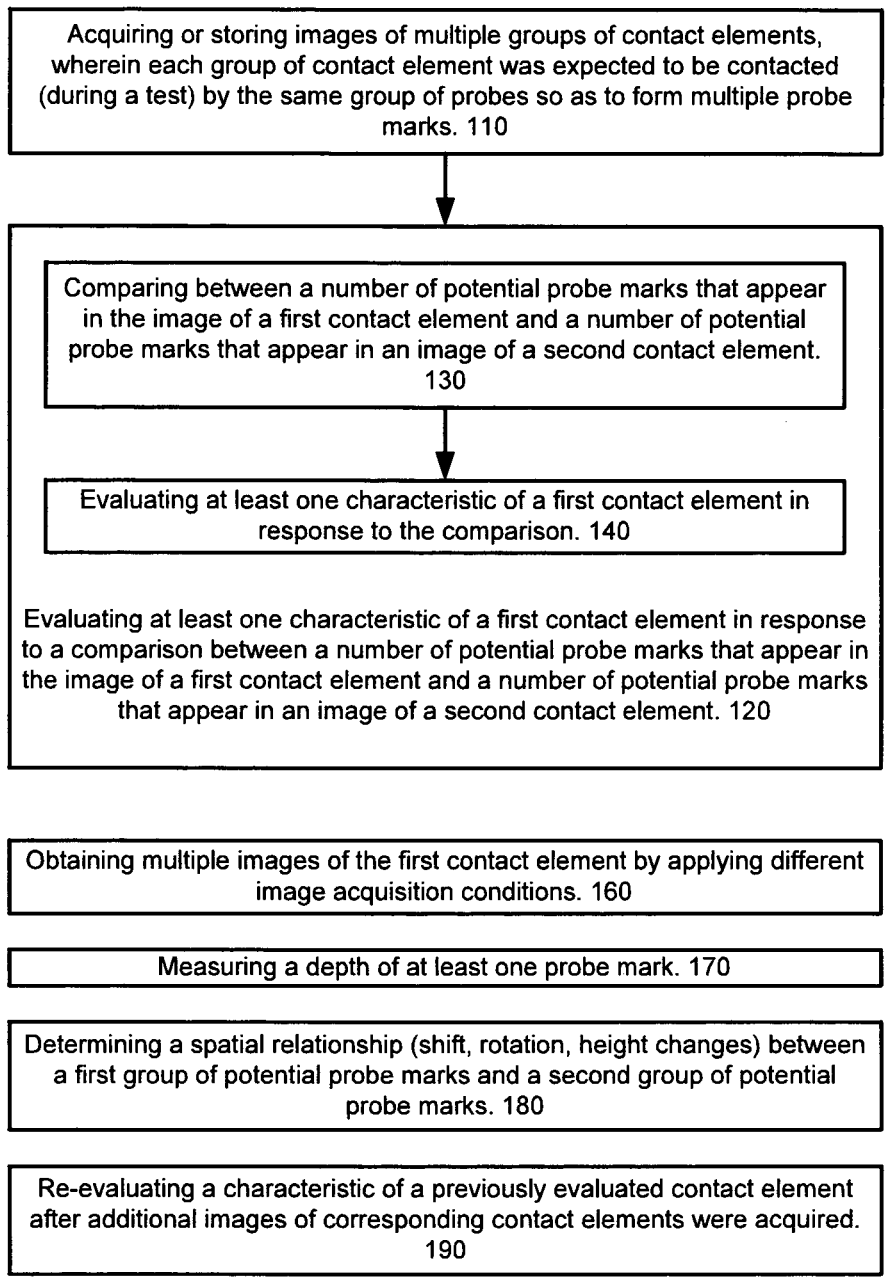
FIG. 3 illustrates a method for evaluating contact elements, according to an embodiment of the invention.

FIG. 3 illustrates method 100 for evaluating contact elements, according to an embodiment of the invention.

Method 100 starts by stage 110 of acquiring or storing images of multiple groups of contact elements, wherein each group of contact element was expected to be contacted (during a test) by the same group of probes so as to form multiple probe marks. It is noted that the group of probes form multiple probe marks. Stage 110 can include a formation of a single probe mark per contact element. It is noted that in some cases (and due to an obstacle or to a probe related problem) a contact element is not even touched by a probe.

Stage 110 can include optically acquiring the images or receiving electrical (or other) signals representative of optically acquired images. It is noted that optically acquired images can be acquired by using various types of radiation, including but not limited to visual light, infra red, ultra violet, deep ultraviolet and even charged particle beams.

Conveniently, the images of multiple contact elements can include one or more images per a group of contact elements.

Conveniently, an image of a contact element can also include the surrounding or the close surroundings of the contact element.

The images are conveniently two dimensional images but they can be reconstructed to provide a three dimensional representation of the inspected contact elements. It is noted that the images can be acquired by one or more cameras, wherein multiple cameras can provide a two dimensional image, a three dimensional image, a con-focal image, and the like.

Stage 110 is followed by stage 120 of evaluating at least one characteristic of a first contact element in response to a comparison between a number (Np1) of potential probe marks that appear in the image of a first contact element and a number, (Np2) of potential probe marks that appear in an image of a second contact element.

Stage 120 includes stages 130 and 140.

Stage 130 includes comparing between the number (Np1) of potential probe marks that appear in the image of a first contact element and the number (Np2) of potential probe marks that appear in an image of a second contact element. Additionally, stage 130 can include a comparison between other characteristics of the potential probe marks that appear in the image of the first contact element and in the image of the second contact element. The other characteristics can include the shape the potential probe marks, their location (along x, y and even z axes) and the like. Stage 130 can include correlating between the images of the first and second contact elements.

Stage 130 can be responsive to the expected number of probe marks in each of the first and second contact elements.

Stage 140 includes evaluating at least one characteristic of a first contact element in response to the comparison.

If, for example, the numbers (of potential probe marks in the first contact element and in the second contact element) are equal to each other (and both contact elements were expected to be contacted that number of times) than the first contact element and the second contact element can be regarded as valid.

If, for example, the number of potential probe marks in the first contact element is higher than the number of potential probe marks in the second contact element and if that difference does not result entirely from expected differences between the numbers of probe marks per contact element (for example the first contact element is expected to be tested more times than the second contact element) then it can be deducted that the first contact element includes an artifact.

If, for example, the number of potential probe marks in the first contact element is lower than the number of potential probe marks in the second contact element and if the difference does not result entirely from expected differences between the numbers of probe marks per contact element (for example the first contact element is expected to be tested fewer times than the second contact element) then it can be deducted that a probe mark is missing from the first contact element.

It is noted that when the number of potential contact elements within the first contact element differs from the number of potential probe marks in the second contact element (and the difference is not expected in view of the tests that were performed by the group of probes) then the comparison of stage 130 can end. Additionally or alternatively, the method can precede by a comparison of the image of the first (or second) contact element with yet another image of another contact element. Such a comparison can assist in determining which contact element out of the first and second contact elements is invalid or whether the probe that was expected to contact the first contact element is defective or was just temporarily prevented from contacting a contact element due to an obstacle.

According to an embodiment of the invention the first contact element and the second contact element belong to different groups of contact elements. Conveniently, the first contact element and the second contact element were expected to be contacted by the same probe out of the group of probes.

According to another embodiment of the invention the first contact element and the second contact element belong to the same group of contact elements.

It is noted that the evaluating can be responsive to differences between an expected number probe marks within the image of the first contact element and an expected number of probe marks within the image of the second contact element.

It is noted that the images of more than two contact elements can be compared to each other.

Method 100 can include at least one of the following optional stages or a combination thereof: (i) Stage 160 of obtaining multiple images of the first contact element by applying different image acquisition conditions; (ii) Stage 170 of measuring a depth of at least one probe mark; (iii) stage 180 of determining a spatial relationship (shift, rotation, height changes) between a first group of potential probe marks and a second group of potential probe marks; (iv) stage 190 of re-evaluating a characteristic of a previously evaluated contact element after additional images of corresponding contact elements were acquired.

It is noted, in relation to stage 170 that a too deep probe mark can also result in wafer malfunctions. The probe mark depth can be acquired from 2D images or from using a confocal-chromatic 3D sensor. An example of a method and system for evaluating a depth of a probe mark are illustrated by PCT patent application PCT IL2007/000859, titled "System and method for probe mark analysis" which is incorporated herein by reference. It is noted that at least one of these stages or a combination thereof can be included in either one of methods 200 of FIG. 4, method 400 of FIG. 6, method 600 of FIG. 7.

Figure 4:
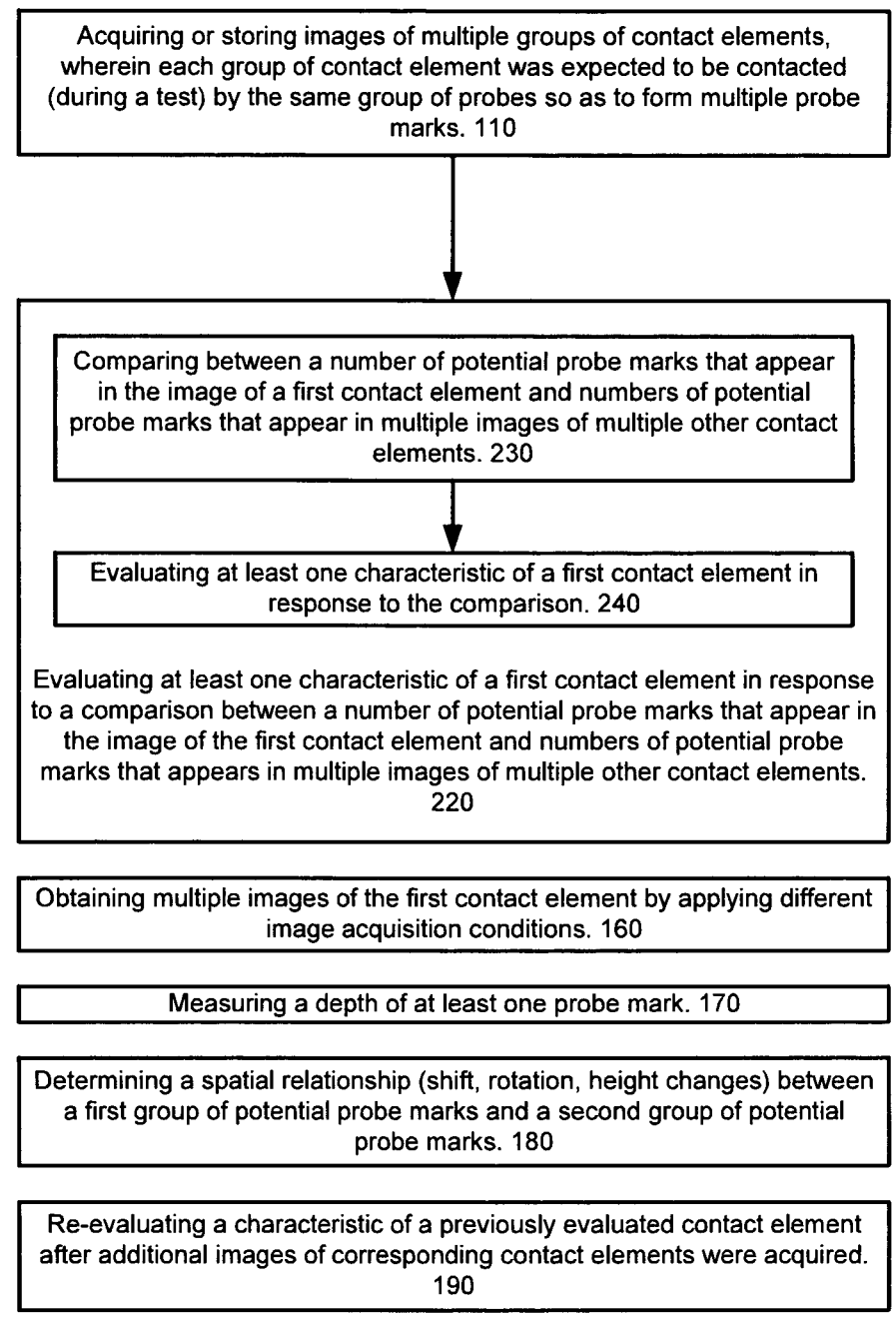
FIG. 4 illustrates a method for evaluating contact elements, according to an embodiment of the invention.

FIG. 4 illustrates method 200 for evaluating contact elements, according to an embodiment of the invention.

Method 200 starts by stage 110 of acquiring or storing images of multiple groups of contact elements, wherein each group of contact element was expected to be contacted during a test by the same group of probes so as to form multiple probe marks.

Stage 110 is followed by stage 220 of evaluating at least one characteristic of a first contact element in response to a comparison between a number of potential probe marks that appear in the image of the first contact element and numbers of potential probe marks that appears in multiple images of multiple other contact elements.

Thus, for example, the number of potential probe marks in an image of the first contact element can be compared to the number of potential probe marks in an image of a second contact element, to the number of potential probe marks in an image of a third contact element and so on. Assuming that theses numbers are expected to be equal to each other a missing probe mark or a artifact can be detected by finding the contact element that includes a number of potential probe marks that differs from the number of potential probe marks in images of other contact elements.

Stage 220 includes stages 230 and 240.

Stage 230 includes comparing between a number of potential probe marks that appear in the image of a first contact element and numbers of potential probe marks that appears in multiple images of multiple other contact elements.

Stage 230 can include correlating between the images of the multiple contact elements.

Stage 230 can be responsive to the expected number of probe marks in each of the first and second contact elements.

Stage 240 includes evaluating at least one characteristic of a first contact element in response to the comparison.

Figure 5:
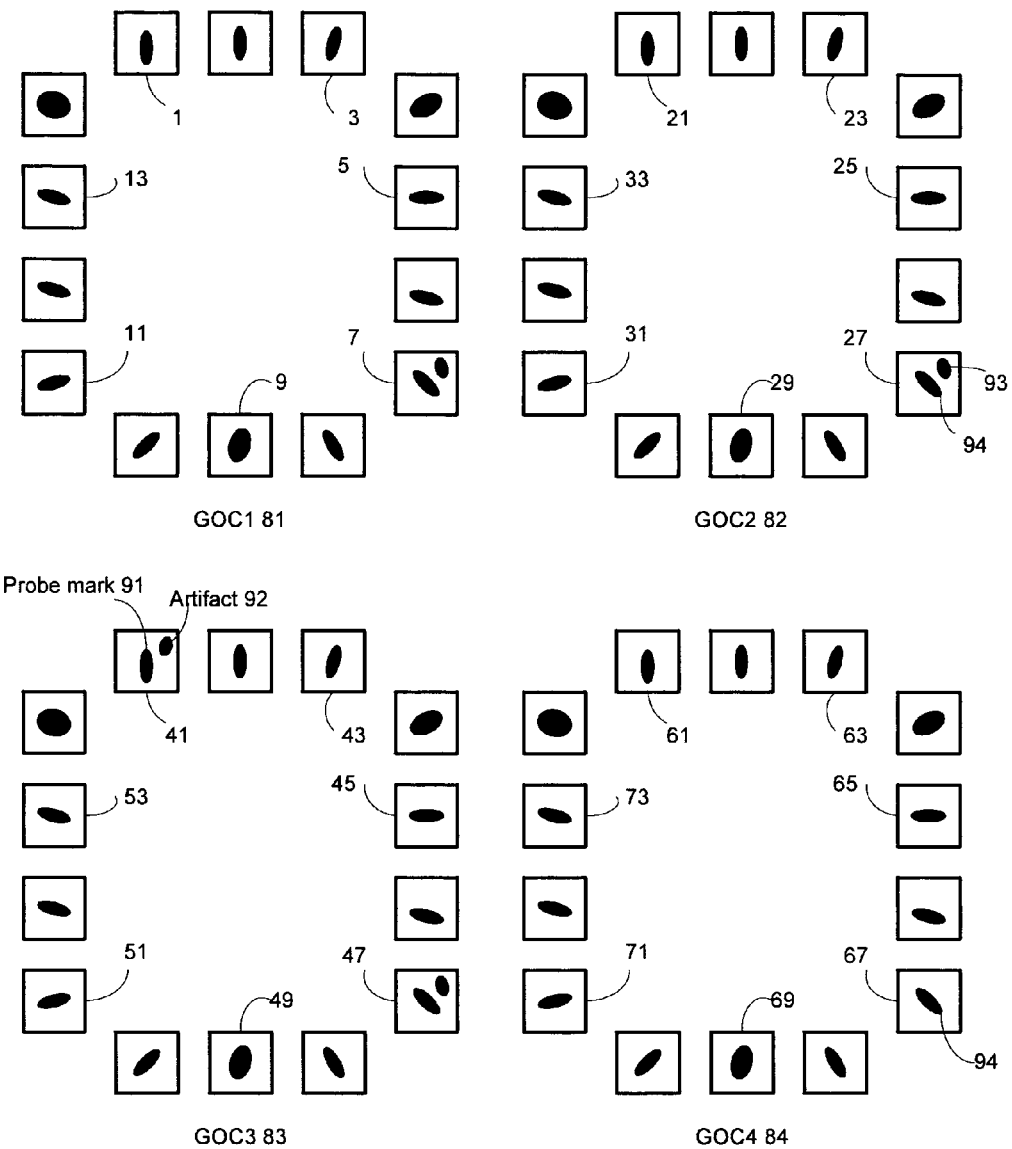
FIG. 5 illustrates four images of four groups of contact elements.

FIG. 5 illustrates four groups of contact elements 81-84 according to an embodiment of the invention.

Each group of probes includes fourteen probes that are positioned in a rectangular shaped array. The upper and lower ribs of the rectangular array include three probes each and the right and left ribs include four probes each. Accordingly, each group of contact elements has a rectangular formation—three contact elements are position in the top and the bottom of the group while four contact elements are positioned at the right and left sides of the contact element group.

It is noted that each group of contact elements can be connected to a singe die.

It is noted that a single probe card can concurrently contact multiple (K) groups of contact elements. In this case, some groups of contacts can be expected to be contacted more than others. In this case the comparisons should take into account this difference. For example, if there are three dice at a certain row of dices and the probe card can touch two contact element groups of two dice at a time. In this scenario the group of contact element of the central dice will be touched twice.

These four images represent four test iterations. Each test iteration can include contacting a group of contact elements by a group of probes and optionally electrically testing the group of probes.

Conveniently, the evaluation of the contact elements of each group is responsive to the images of the other three contact groups. It is noted that other decision rules can be applied. (For example—comparing two or three corresponding contact elements to each other).

Conveniently, these images can be acquired by automatically detecting the group of contact groups. An example for such an automatic process is illustrated in PCT patent application PCT-IL2006/001007 titled "A method and a system for establishing an inspection recipe" which is incorporated herein by reference.

For simplicity of explanation the contact elements of each group of contact elements will be numbered in a clock wise manner starting from the top left contact element. The three top contact elements will be referred to as the first till third contact elements, the four right contact elements will be referred to as the fourth contact element till the seventh contact element, the three bottom contact elements will be referred to as the eighth till eleventh contact elements and the four left side contact elements will be referred to as the twelfth till fourteenth contact elements.

The top three contact elements of GOC1 81 include contact elements such as contact elements 1 and 3. The four right contact elements of GOC1 81 include contact elements such as contact elements 5 and 7. The bottom three contact element of GOC1 81 include contact elements such as contact element 9. The four left contact elements of GOC1 81 include contact elements such as contact elements 11 and 13.

The top three contact elements of GOC2 82 include contact elements such as contact elements 21 and 23. The four right contact elements of GOC2 82 include contact elements such as contact elements 25 and 27. The bottom three contact element of GOC2 82 include contact elements such as contact element 29. The four left contact elements of GOC2 82 include contact elements such as contact elements 31 and 33.

The top three contact elements of GOC3 83 include contact elements such as contact elements 41 and 43. The four right contact elements of GOC3 83 include contact elements such as contact elements 45 and 47. The bottom three contact element of GOC3 83 include contact elements such as contact element 49. The four left contact elements of GOC3 83 include contact elements such as contact elements 51 and 53.

The top three contact elements of GOC4 84 include contact elements such as contact elements 61 and 63. The four right contact elements of GOC4 84 include contact elements such as contact elements 65 and 67. The bottom three contact element of GOC4 84 include contact elements such as contact element 69. The four left contact elements of GOC1 84 include contact elements such as contact elements 71 and 73.

Each contact element includes one or more potential probe marks that are represented by black shapes.

If, for example, the image of the seventh contact element 67 of the fourth group of contact elements GOC4 84 has a single potential probe 94 mark while the seventh contact elements (7, 27 and 47) of the first, second and third groups of contact elements include two potential probe marks (93 and 94) each then the seventh contact element of the fourth group of contact elements is defined as invalid due to a missing probe mark. If, for example, the fourth group of contact element were tested before any two of the remaining groups of contact element then it can be estimated that an obstacle prevented the probe from contacting the seventh contact element of the third group of contact elements.

If, for example, the first contact element 41 of the third group of elements GOC1 83 includes two potential probe marks (that can be a pair of probe marks or a probe mark 91 and an artifact 92) while the first contact elements (1, 21 and 61) of the first, second and fourth groups of contact elements include a single probe mark each then the first contact element of the third group of contact element will be defined as including a single probe mark and an artifact and the first contact element of the third group of contact elements will de defined as valid.

FIG. 6 illustrates method 400 for evaluating a test characteristic according to an embodiment of the invention.

Method 400 starts by stage 110. Additionally or alternatively, method 400 can start by stage 710 of FIG. 8.

Stage 110 is followed by stage 420 of evaluating at least one test characteristic in response to a comparison between a number of potential probe marks that appear in the image of a first contact element and a number of potential probe marks that appear in at least one image of at least one other contact element.

Stage 420 can include evaluating at least one test characteristic in response at least one change in a number of potential probe marks that appear in images of different contact elements that were expected to be contacted by the same probe at different points in time. Stage 420 can include a stage of comparing the number of potential probe marks and then performing an evaluation based on the comparison.

Stage 420 can include stage 422 of determining that an obstacle prevented a functioning probe from contacting a contact element during one or more tests. Such a determination can occur if the number of potential probe marks within corresponding contact elements (that belong to different groups of contact elements but were expected to be contacted by the same probe) decreased and then resumed to their original number. The temporal decrement resulted from an obstacle that prevented the probe from contacting one or more contact elements and imprinting the probe mark.

Stage 420 can include stage 424 of determining that a probe is defective. Such a determination can occur if the number of potential probe marks within contact elements (that belong to different groups of contact elements but were expected to be contacted by the same probe) decreased but did resume to its original number. Either one of the mentioned above methods or a combination thereof can be implemented a computer that executes a computer readable program. Accordingly, a computer program product is provided. It includes a computer usable medium including a computer readable program, wherein the computer readable program when executed on a computer causes the computer to: (i) receive images of multiple groups of contact elements, wherein each group of contact element was expected to be contacted during a test by the same group of probes so as to form multiple probe marks; and (ii) evaluate at least one characteristic of a contact element in response to a comparison between a number of potential probe marks that appear in the image of a first contact element and a number of potential probe marks that appear in an image of a second contact element.

Conveniently, the first contact element and the second contact element belong to different groups of contact elements.

Conveniently, the first contact element and the second contact element were expected to be contacted by the same probe out of the group of probes.

Conveniently, the first contact element and the second contact element belong to the same group of contact elements.

Conveniently, the computer readable program when executed on a computer causes the computer to evaluate at least one characteristic of a first contact element in response to differences between an expected number probe marks within the image of the first contact element and an expected number of probe marks within the image of the second contact element.

Conveniently, the computer readable program when executed on a computer causes the computer to evaluate at least one characteristic of a first contact element in response to a comparison between a number of potential probe marks that appear in the image of a first contact element and numbers of potential probe marks that appears in multiple images of multiple other contact elements.

Conveniently, the computer readable program when executed on a computer causes the computer to evaluate at least one characteristic of a first contact element in response at least one change in a number of potential probe marks that appear in images of different contact elements that were expected to be contacted by the same probe.

Conveniently, the computer readable program when executed on a computer causes the computer to evaluate at least one test characteristic in response to the comparison between the number of potential probe marks that appear in the image of the first contact element and the number of potential probe marks that appear in the image of the second contact element.

Conveniently, the computer readable program when executed on a computer causes the computer to ignore an artifact that resembles a probe mark.

Conveniently, the computer readable program when executed on a computer causes the computer to determine that an obstacle prevented a functioning probe from contacting a contact element during one or more tests.

Conveniently, the computer readable program when executed on a computer causes the computer to determine that a probe is defective.

Conveniently, the computer readable program when executed on a computer causes the computer to measure a depth of at least one probe mark.

Conveniently, the computer readable program when executed on a computer causes the computer to determine a spatial relationship between a first group of potential probe marks and a second group of potential probe marks.

Figure 7:
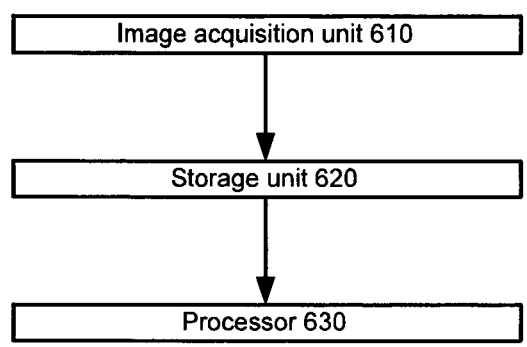
FIG. 7 illustrates a system according to an embodiment of the invention.

FIG. 7 illustrates system 600 according to an embodiment of the invention.

System 600 can include an image acquisition unit or can receive images from another tool, such as an automatic optical inspection tool. FIG. 6 illustrates system 600 as including image acquisition unit 610 but this is not necessarily so.

System 600 includes: (i) storage unit 620 that is adapted to store images of multiple groups of contact elements, wherein each group of contact element was expected to be contacted, during a test, by the same group of probes so as to form multiple probe marks; (ii) processor 630 that is adapted to evaluate at least one characteristic of a first contact element in response to a comparison between a number of potential probe marks that appear in the image of the first contact element and a number of potential probe marks that appear in an image of a second contact element; and (iii) image acquisition unit 610 that is adapted to acquire the images of multiple groups of contact elements. Conveniently, system 600 is an automatic optical inspection system and includes additional components (such as a mechanical stage) that are not shown for simplicity of the explanation.

System 600 is can execute one or more of the mentioned above methods and can execute one or more combinations of stages of these different methods.

FIG. 8 illustrates method 700 according to an embodiment of the invention.

Method 700 starts by stage 710 of acquiring or storing images of at least three groups of contact elements of an electrical circuit, wherein each group of contact elements was expected to be contacted during a test by the same group of probes so as to form multiple probe marks.

The electrical circuit is a circuit under test and not a demo. It can be a wafer, a printer circuit board and the like. By comparing images of three or more groups of contact elements it is easier to determine which contact element is exceptional, especially if greater weight is placed on the majority of the readings, as illustrated in relation to FIG. 5 and the comparison between contact elements 1, 21, 41 and 61 as well as the comparison between contact elements 7, 27, 47 and 67.

It is noted that stage 720 can be responsive to one or more of the following: number of potential probe marks, spatial relationship between potential probe marks, and the like.

Stage 710 is followed by stage 720 of evaluating at least one characteristic of a contact element out of the at least three groups of contact elements in response to a comparison between at least one characteristic of each contact element out of a set of contact elements; wherein the set comprises at least at three contact elements out of the at least three groups of contact elements.

Stage 720 can include comparing the number of potential probe marks, comparison between the location, size, orientation of potential probe marks, and the like.

Conveniently, the contact elements of the set belong to different groups of contact elements.

Conveniently, the contact elements of the set were expected to be contacted by the same probe out of the group of probes.

Conveniently, at least a pair of contact elements of the set belongs to the same group of contact elements.

Conveniently, stage 720 of evaluating is further responsive to differences between expected numbers of probe marks within an image of each contact element of the set.

Conveniently, stage 720 of evaluating includes ignoring an artifact that resembles a probe mark.

Conveniently, method 700 includes stage 760 of obtaining multiple images of contact elements of the set by applying different image acquisition conditions.

Conveniently, method 700 includes stage 770 of measuring a depth of at least one probe mark.

Conveniently, method 700 includes stage 780 of determining a spatial relationship between a first group of potential probe marks and a second group of potential probe marks.

Conveniently, the contact elements are bond pads or bumps.

Conveniently, method 700 includes stage 790 of re-evaluating a characteristic of a previously evaluated contact element after additional images of corresponding contact elements were acquired.

Conveniently, a system is provided. It can resemble system 600 of FIG. 6 but it can execute method 700. Additionally or alternatively, such a system can execute either one of the mentioned above methods or a combination thereof.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for evaluating contact elements, the method comprises:
   acquiring images of multiple groups of contact elements, wherein each group of contact elements was expected to be contacted during a test by the same group of probes so as to form multiple probe marks; and
   evaluating at least one characteristic of a first contact element in response to a comparison between a number of potential probe marks that appear in the image of a first contact element and a number of potential probe marks that appear in an image of a second contact element, wherein the evaluating comprises deducting that the image of the first contact element comprises an artifact if the number of potential probe marks that appear in the image of the first contact element exceeds the number of potential probe marks that appear in the image of the second contact element, and the expected number of probe marks within the image of the first contact element equals the expected number of probe marks within the image of the second contact element.

2. The method according to claim 1 wherein the first contact element and the second contact element were expected to be contacted by the same probe out of the group of probes.

3. The method according to claim 1 further comprising measuring a depth of at least one probe mark within the image of the first contact element.

4. The method according to claim 1 comprising evaluating at least one characteristic of a first contact element in response to a comparison between a number of potential probe marks that appear in the image of the first contact element and numbers of potential probe marks that appears in multiple images of multiple other contact elements.

5. A system for evaluating contact elements, the system comprises: a storage unit adapted to store images of multiple groups of contact elements, wherein each group of contact element was expected to be contacted, during a test, by the same group of probes so as to form multiple probe marks; and a processor that is adapted to evaluate at least one characteristic of a first contact element in response to a comparison between a number of potential probe marks that appear in the image of the first contact element and a number of potential probe marks that appear in an image of a second contact element; and to deduct that the image of the first contact element comprises an artifact if the number of potential probe marks that appear in the image of the first contact element exceeds the number of potential probe marks that appear in the image of the second contact element, and the expected number of probe marks within the image of the first contact element equals the expected number of probe marks within the image of the second contact element.

6. The system according to claim 5 wherein the contact elements are bond pads or bumps.

7. The system according to claim 5 wherein the first contact element and the second contact element were expected to be contacted by the same probe out of the group of probes.

8. The system according to claim 5 further adapted to measure a depth of at least one probe mark within the image of the first contact element.

9. The system according to claim 5 wherein the processor is adapted to evaluate at least one characteristic of a first contact element in response at least one change in a number of potential probe marks that appear in images of different contact elements that were expected to be contacted by the same probe.

10. A method for evaluating contact elements, the method comprises: acquiring images of at least three groups of contact elements of an electrical circuit, wherein each group of contact elements was expected to be contacted during a test by the same group of probes so as to form multiple probe marks; and evaluating at least one characteristic of a contact element out of the at least three groups of contact elements in response to a comparison between at least one characteristic of each contact element out of a set of contact elements; wherein the set comprises at least at three contact elements out of the at least three groups of contact elements.

11. The method according to claim 10 wherein the evaluating comprises ignoring an artifact that resembles a probe mark.

12. The method according to claim 10 wherein the evaluating comprises determining that an obstacle prevented a functioning probe from contacting a contact element during one or more tests.

13. The method according to claim 10 further comprising obtaining multiple images of a contact element of the set by applying different image acquisition conditions.

14. The method according to claim 10 further comprising measuring a depth of at least one probe mark.

15. The method according to claim 10 further comprising determining a spatial relationship between a first group of potential probe marks and a second group of potential probe marks.

16. The method according to claim 10 wherein the contact elements are bond pads or bumps.

17. A system for evaluating contact elements, the system comprises: a storage unit adapted to store images of at least three groups of contact elements of an electrical circuit, wherein each group of contact elements was expected to be contacted during a test by the same group of probes so as to form multiple probe marks; and a processor, adapted to evaluate at least one characteristic of a contact element out of the at least three groups of contact elements in response to a comparison between at least one characteristic of each contact element out of a set of contact elements; wherein the set comprises at least at three contact elements out of the at least three groups of contact elements.

18. The system according to claim 17 wherein the processor is responsive to differences between expected number of probe marks within an image of each contact element of the set.

19. The system according to claim 17 wherein the processor is adapted to determine that a probe is defective.

20. The system according to claim 17 comprising an image acquisition unit adapted to obtain multiple images of a contact element of the set by applying different image acquisition conditions.

21. The system according to claim 17 wherein the processor is adapted to measure a depth of at least one probe mark.

22. A computer program product comprising a non-transitory computer usable medium including a computer readable program, wherein the computer readable program when executed on a computer causes the computer to: receive images of at least three groups of contact elements of an electrical circuit, wherein each group of contact elements was expected to be contacted during a test by the same group of probes so as to form multiple probe marks; and evaluate at least one characteristic of a contact element out of the at least three groups of contact elements in response to a comparison between at least one characteristic of each contact element out of a set of contact elements; wherein the set comprises at least at three contact elements out of the at least three groups of contact elements.

* * * * *